United States Patent
Ochi et al.

(10) Patent No.: US 7,839,893 B2
(45) Date of Patent: Nov. 23, 2010

(54) VOICE DATA TRANSMITTING AND RECEIVING SYSTEM

(75) Inventors: Ryouichi Ochi, Kawasaki (JP); Yoshikazu Kobayashi, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 1260 days.

(21) Appl. No.: 10/720,135

(22) Filed: Nov. 25, 2003

(65) Prior Publication Data

US 2004/0105464 A1  Jun. 3, 2004

(30) Foreign Application Priority Data

Dec. 2, 2002  (JP) .............................. 2002-349621

(51) Int. Cl.
*H04J 3/24* (2006.01)
(52) U.S. Cl. ...................................... 370/474; 370/465
(58) Field of Classification Search ................. 370/216, 370/226, 218, 230, 230.1, 231, 464, 470, 370/471, 473, 474, 475, 477, 351, 352, 338, 370/345, 444, 461, 468, 521, 412, 347; 704/231, 704/246, 251, 260, 278, 500, 207, 210, 236, 704/4; 709/204; 379/900; 395/2; 381/43

See application file for complete search history.

(56) References Cited

U.S. PATENT DOCUMENTS

| | | | | | |
|---|---|---|---|---|---|
| 3,855,416 | A | * | 12/1974 | Fuller | 704/272 |
| 4,093,821 | A | * | 6/1978 | Williamson | 704/207 |
| 5,058,167 | A | * | 10/1991 | Kimura | 704/249 |
| 5,148,429 | A | * | 9/1992 | Kudo et al. | 370/473 |
| 5,444,817 | A | * | 8/1995 | Takizawa | 704/254 |
| 5,943,347 | A | * | 8/1999 | Shepard | 714/747 |
| 5,963,551 | A | * | 10/1999 | Minko | 370/356 |
| 6,044,348 | A | * | 3/2000 | Imade et al. | 704/278 |
| 6,055,495 | A | * | 4/2000 | Tucker et al. | 704/210 |
| 6,226,361 | B1 | * | 5/2001 | Koyama | 379/88.07 |
| 6,393,388 | B1 | * | 5/2002 | Franz et al. | 704/4 |
| 6,445,717 | B1 | * | 9/2002 | Gibson et al. | 370/473 |
| 6,480,827 | B1 | * | 11/2002 | McDonald | 704/500 |
| 6,546,009 | B1 | * | 4/2003 | Begeja et al. | 370/389 |
| 6,553,021 | B1 | * | 4/2003 | Bishop et al. | 370/347 |
| 6,711,545 | B1 | * | 3/2004 | Horndl | 704/275 |
| 6,754,265 | B1 | * | 6/2004 | Lindemann | 375/240 |

(Continued)

FOREIGN PATENT DOCUMENTS

JP  03-038699  2/1991  ................. 704/205

(Continued)

OTHER PUBLICATIONS

D.L. Lee and F.H. Lochovsky, Voice Response Systems, Dec. 1983, Computing Surveys, vol. 15, pp. 357,356,362,363.*

(Continued)

*Primary Examiner*—Steven H Nguyen
*Assistant Examiner*—Syed Bokhari
(74) *Attorney, Agent, or Firm*—Foley & Lardner LLP

(57) ABSTRACT

Voice clauses are divided and transmitted as packet data in divided clause units in a transmission side. The voice data is outputted as voice based on the received packet data in clause units in a receipt side. Thus, the meaning of speech is even able to be recognized in a deteriorated communication path environment.

19 Claims, 5 Drawing Sheets

U.S. PATENT DOCUMENTS

| | | | |
|---|---|---|---|
| 6,775,652 B1 * | 8/2004 | Cox et al. | 704/236 |
| 6,836,804 B1 * | 12/2004 | Jagadeesan | 709/236 |
| 6,944,591 B1 * | 9/2005 | Raghunandan | 704/235 |
| 7,013,267 B1 * | 3/2006 | Huart et al. | 704/207 |
| 7,069,208 B2 * | 6/2006 | Wang | 704/211 |
| 7,117,152 B1 * | 10/2006 | Mukherji et al. | 704/235 |
| 7,136,811 B2 * | 11/2006 | Tirpak et al. | 704/221 |
| 7,177,811 B1 * | 2/2007 | Ostermann et al. | 704/260 |
| 2001/0053975 A1 * | 12/2001 | Kurihara | 704/260 |
| 2003/0179745 A1 * | 9/2003 | Tsutsumi et al. | 370/352 |
| 2004/0220801 A1 * | 11/2004 | Sato | 704/207 |

FOREIGN PATENT DOCUMENTS

| | | |
|---|---|---|
| JP | 07-272447 | 10/1995 |
| JP | 09-120295 | 5/1997 |
| JP | 10-097280 | 4/1998 |
| JP | 10-285275 | 10/1998 |
| JP | 11-234279 | 8/1999 |
| JP | 2001-024703 | 1/2001 |
| JP | 2001-142488 | 5/2001 |
| JP | 2003-283557 | 10/2003 |

OTHER PUBLICATIONS

Chris Schmandt, Jang Kim, Kwan Lee, Gerado Vallejo, Mark Ackerman, Mediated Voice Communication via Mobile IP, Oct. 27-30, 2002, UIST, vol. 4, issue 2, pp. 142-143.*

* cited by examiner

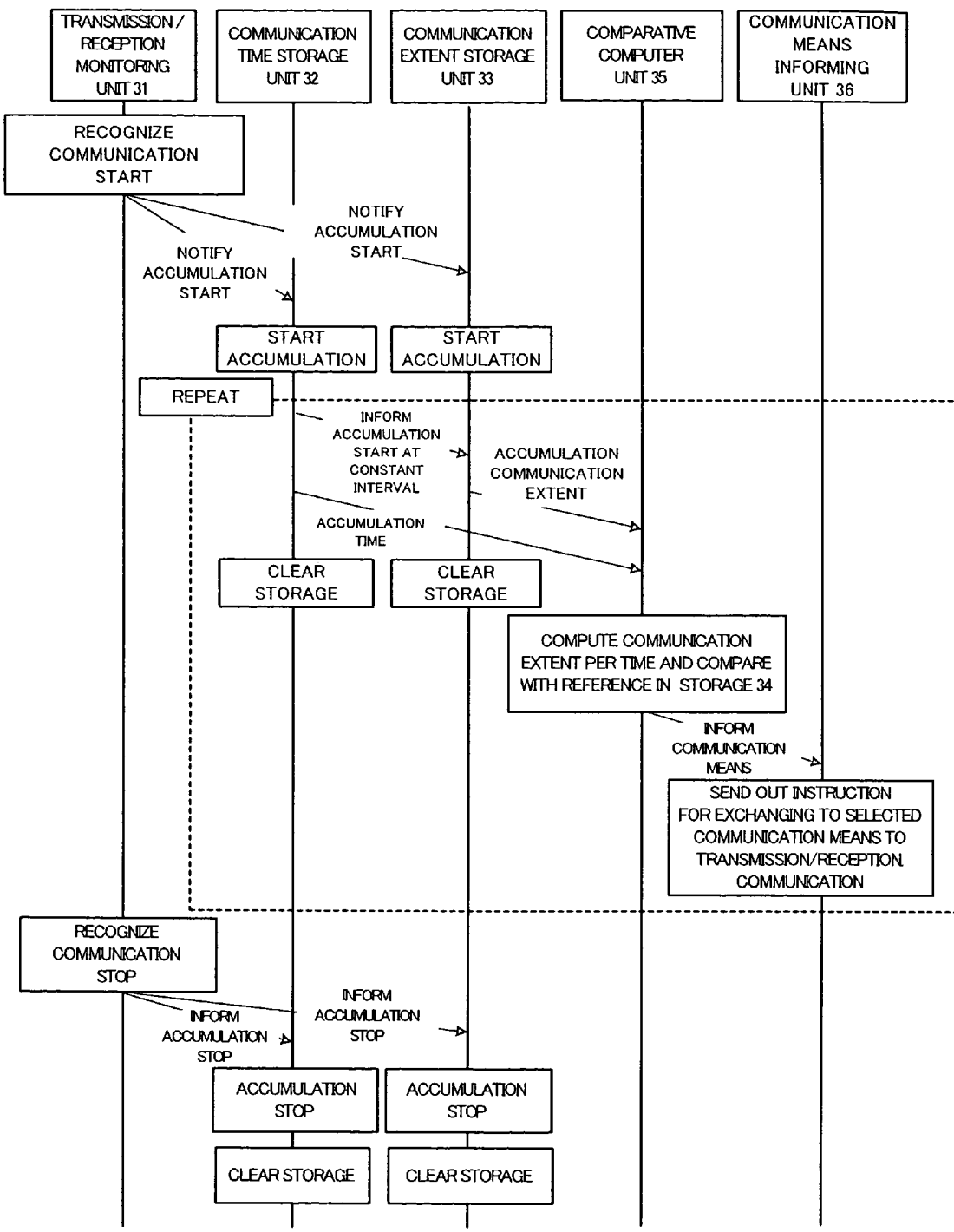

VOICE DATA TRANSMITTING AND RECEIVING SYSTEM

BACKGROUND OF THE INVENTION

This application claims the benefit of Japanese Patent Application No. 2002-349621 filed on Dec. 2, 2002, the contents of which are incorporated by reference herein.

The present invention relates to voice data transmitting and receiving systems and, more particularly, to a voice data transmitting and receiving system capable of securing meaning from data transmitted via a communication path, such as a quality of services (QoS) non-guaranteed network that may be, for instance, the Internet.

The Internet is in common use across borders and all over the world. Electronic commerce transactions and Internet telephone, i.e., internet protocol (IP) telephone, are attracting attention aside from such conventional applications as reading of web pages, electronic mail, and file transfer. This is greatly attributable to a rapid advancement of not only networks centered on line exchange in telephone networks, but also IP networks based on packet exchange.

In some IP telephone communication, various data including voice (or FAX) data and also data of still images and motion picture images, are converted to IP packets to be transferred in an IP based network. What is called Internet telephone is the utilization, in part of or full, of the same IP network, i.e., communication network, for communication in Internet protocol as is utilized for such applications as the World Wide Web, for voice telephone service utilizing IP network techniques.

Among IP telephone systems are the following three different systems. In a first one of these systems, voice messages are exchanged between personal computers which are dial-up interconnected on the Internet. In this system, it is necessary that the same software is installed in the personal computers, which are in turn connected to a server. In a second system, communication cannot be obtained unless a telephone call is provided from a personal computer to a usual subscribed telephone set (converse call being impossible) or prearrangements are made between the two sides. As a third system, two systems are present. In one of these systems, communication is made by inputting a user ID and a PIN via an Internet telephone gateway to a point of connection between an Internet network for communication between usual subscribers' telephone sets and a public telephone line switchboard. The other system is one for communication between direct Internet-coupled terminals. These systems are closest to the present telephone communication system, and their technical advancement is outstanding.

In the meantime, a system for transmitting a great deal of voice data in a narrow band has been proposed, in which on the transmission side an input voice is converted by voice recognition to character data, which are packeted and then transmitted, and on the reception side the received character data is converted to voice data, followed by voice synthesis and output of the resultant data as voice, thereby greatly reducing the transmitted data quantity and avoiding communication delay (see, for instance, Literature 1: Japanese patent laid-open Hei 10-285275). This system, however, although it has an advantage of reducing transmitted data quantity, is based on character data transfer. Therefore, the voice obtained by the synthesis has a fixed character, and is different in character from the speaker's voice.

In IP voice communication via an IP network such as the Internet or a local network without guaranteed QoS communication quality, usually Real Time Communication Packets (RTPs) of User Data Packet (UDP) protocol are used for transmission and reception of voice data. In this case, although RTPs are used with importance attached to the real-time property of data in voice communication and motion picture playback, for the RTP no measure is provided against packet loss occurring on a communication path, and lost packets are not re-transferred, thus posing problems in voice quality, such as interruptions of voice.

To cope with these problems, heretofore, a system has been proposed, in which RTPs are transmitted together with preceding and succeeding packet data for an interpolating process according thereto, so that the voice will not be interrupted even in a packet loss event. However, in an environment in which data communication other than voice is frequently present, voice packet loss is pronounced, and the voice quality deterioration is too significant even by using the interpolation, sometimes resulting in failure of recognizing the meaning of the speech.

As shown above, the real-time voice communication by packet transmission is subject to loss of RTPs due to deterioration of a communication path environment, thus resulting in lost parts of voice data. Heretofore, satisfactory communication could be obtained only in good communication environments.

SUMMARY OF THE INVENTION

An object of the present invention, accordingly, is to provide a voice data transmitting and receiving system capable of allowing for the recognizing of the meaning of speech even in a deteriorated communication path environment.

Another object of the present invention is to provide a voice data transmitting and receiving system capable of allowing for the recognizing of the meaning of speech irrespective of packet loss due to causes in the communication path.

According to a first aspect of the present invention, there is provided a voice data transmitting and receiving system for transmitting and receiving voice data as packet data via a network, wherein: on a transmission side voice clauses are divided and transmitted as packet data in divided clause units, and on a reception side the voice data is outputted as voice based on the received packet data in clause units.

According to a second aspect of the present invention, there is provided a voice data transmitting and receiving system, wherein: on the transmission side: real-time communication packets are generated based on input voice data; the input voice data is divided into clause units; and a plurality of RTP voice data in the clause units are transferred as packet data to a communication path; and on the reception side: packet data in clause units are obtained from packeted received data received via the communication path, thereby producing a replica of the RTPs in clause units; and outputting the voice data as voice based on the replica of the RTPs.

According to a third aspect of the present invention, there is provided a voice data transmitting and receiving system, wherein on the transmission side: real-time communication packets are generated based on input voice data; the input voice data is divided off into clause units; and a plurality of voice data RTPs in the clause units are combined into a single packet data and transferred to a communication path; and on the reception side: packet data in clause units are obtained from packeted received data received via the communication path, thereby producing a replica of the RTPs in clause units; and the voice data is outputted as voice based on the plurality of RTPs.

The data sent out from the transmission side is in the form of a file. On the transmission side either a re-transfer request is provided by recognizing the missing of received data or an interpolation process on the received data is executed based on the received file data. The file data sent out from the transmission side is provided with discrimination data. In the reception, transmission side data is taken out from the received file data based on the discrimination data. The voice is divided into clauses based on voice recognition. The voice is divided into clauses based on an externally provided instruction. The voice is divided into clauses based on the sound level of the input voice. The voice is divided off into clauses based on changes in the input voice pitch level. The voice is divided off into clauses based on measured movement of the user's lips. The voice is divided off into clauses based on measured vibrations of the users throat. The systems are selected based on the extent of communication per unit time between the transmission and reception sides.

According to a fourth aspect of the present invention, there is provided a voice data transmitting and receiving method as packet data via a network, wherein voice clauses are divided and transmitted as packet data in divided clause units in a transmission side, and the voice data is outputted as voice based on the received packet data in clause units in a receipt side.

According to a fifth aspect of the present invention, there is provided a voice data transmitting and receiving method, wherein: real-time communication packets are generated based on input voice data, the input voice data is divided into clause units and a plurality of RTP voice data in the clause units are transferred as packet data to a communication path in a transmission side; and packet data in clause units are obtained from packeted received data received for producing a replica of the RTPs in clause units; and the voice data is outputted as voice based on the replica of the RTPs in a receipt side.

According to a sixth aspect of the present invention, there is provided a voice data transmitting and receiving method, wherein real-time communication packets are generated based on input voice data, the input voice data is divided off into clause units and a plurality of voice data RTPs in the clause units are combined into a single packet data and transferred to a communication path in a transmission side; and packet data in clause units are obtained from packeted received data for producing a replica of the RTPs in clause units and the voice data is outputted as voice based on the plurality of RTPs.

Other objects and features will be clarified from the following description with reference to the attached drawings.

BRIEF DESCRIPTION OF THE DRAWINGS

FIG. 5 is a view for describing the operation of the embodiment shown in FIG. 4.

PREFERRED EMBODIMENTS OF THE INVENTION

Preferred embodiments of the present invention will now be described with reference to the drawings.

Figure 1:
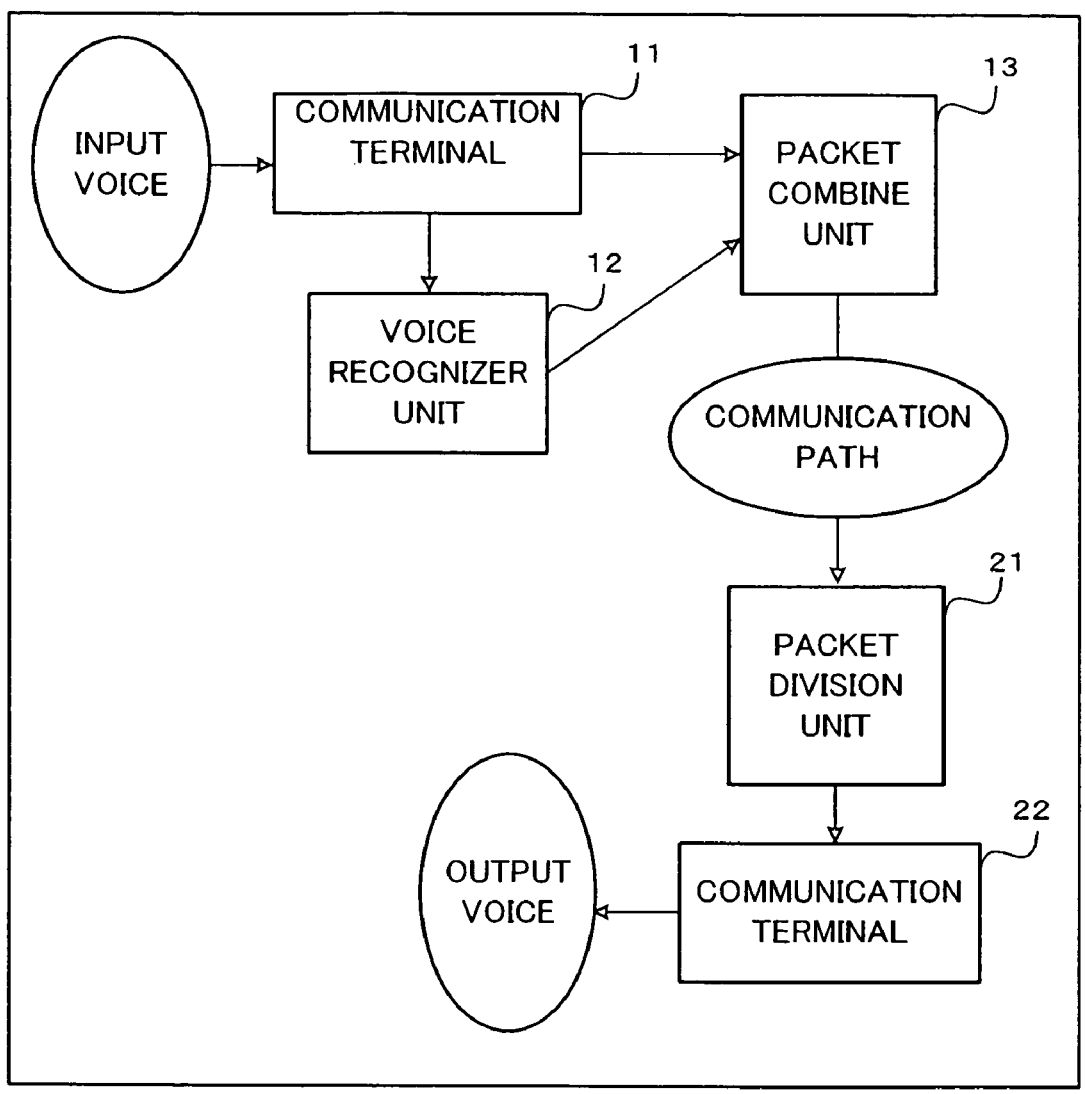
FIG. 1 is a system structure of a voice data transmitting and receiving system of a first embodiment according to the present invention.

FIG. 1 is a system structure of a voice data transmitting and receiving system of a first embodiment according to the present invention. In this embodiment, the transmission side comprises a communication terminal 11, a voice recognizer unit 12 and a packet combine unit 13, and the reception side which is connected to the transmission side via the Internet or like communication channel, comprises a packet division unit 21 and a communication terminal 22. While each user of course has both transmitting and receiving functions for the conversation purpose, in the following description the transmission and reception side are dealt with separately.

On the transmission side, a user's voice inputted to a microphone or like voice input device is processed as voice data in a communication terminal 11. On the reception side, a communication terminal 22 processes the voice, and outputs the processed voice via a loudspeaker or like voice output device.

On the transmission side, the communication terminal 11 generates real-time communication packets (hereinafter abbreviated as RTP) based on the input voice data. The voice recognizer unit 12 receives the voice data from the communication terminal 11, and executes a voice recognition process to divide off the voice into clause units. The packet combine unit 13 combines a plurality of voice data RTPs in clause units from the voice recognizer unit 12 into a single packet data to be sent out to a communication path. The packet combine unit 13 may send out the voice data RTPs in clause units as such.

On the reception side, the packet division unit 21 executes packet division of packeted received data received via the communication path to obtain RTPs of voice data in clause units, thus producing replica of a plurality of RTPs as clause units. The communication terminal 22 reproduces the transmission side voice data based on the plurality of RTPs received from the packet division unit 21.

As shown above, in this embodiment clause units as divisions having means of voice composition are discriminated for transmission and reception as real-time communication packets in the discriminated clause units. Thus, even when packet loss occurs on the communication path due to deterioration of the communication environment due to such cause as communication line deterioration, the meaning of each clause can be transmitted, and reliable data transfer is possible.

Figure 2:
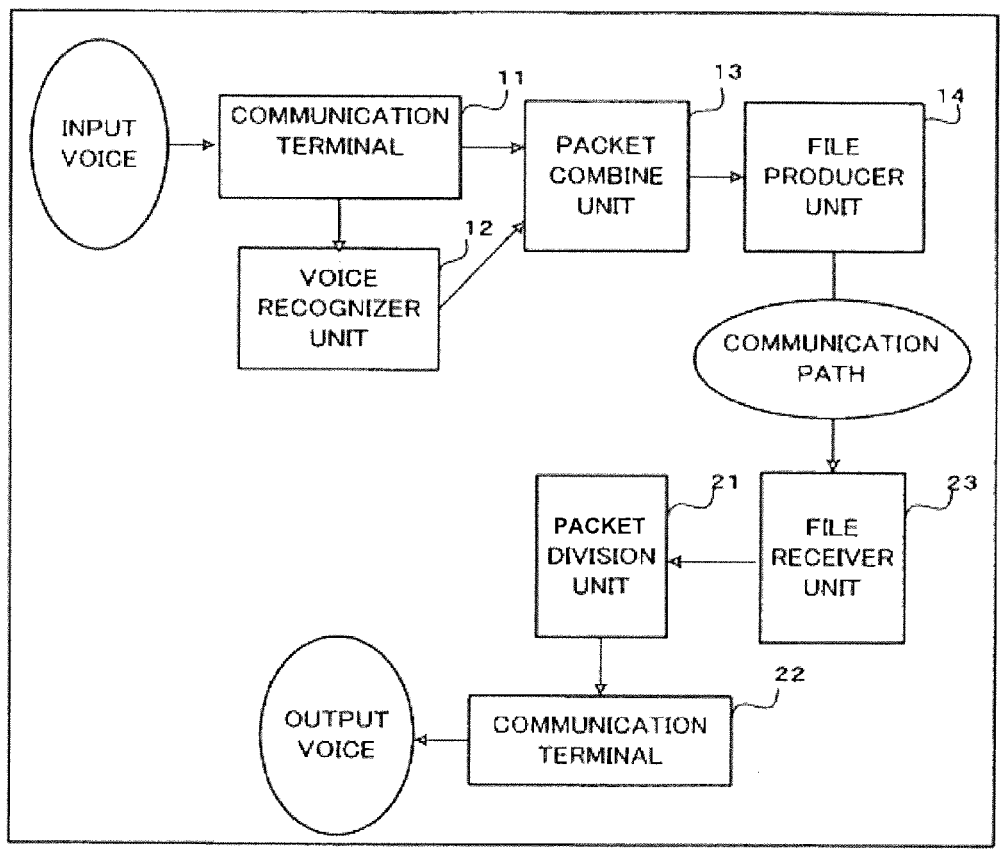
FIG. 2 is a system structure of a voice data transmitting and receiving system of a second embodiment according to the present invention.

A second embodiment of the voice data transmitting/receiving system according to the present invention will now be described with reference to the block diagram of FIG. 2. In FIG. 2, parts having functions like those in the case of FIG. 1 are designated by like reference numerals.

In this embodiment, the transmission side comprises a communication terminal 11, a voice recognizer unit 12, a packet combine unit 13 and a file producer (filing) unit 14, and the reception side which is connected to the transmission side via the Internet or like communication path comprises a packet division unit 21, a communication terminal 22 and a file receiver unit 23.

On the transmission side, the communication terminal 11 generates RTPs based on the input voice data. The voice recognizer unit 12 executes a voice recognition process on the voice data from the communication terminal 11 to divide off voice into clause units. The packet combine unit 13 combines a plurality of voice data RTPs in clause units to produce a single packet data to be sent out to the file producer unit 14. The file producer unit 14 produces as file of the receive packets, and sends out the file to the communication path.

On the reception side, the file receiver unit 23 receives the file data received via the communication path, and sends out the received file data as packet data to the packet division unit 21. The file receiver unit 23 also recognizes missing, if any, of received data from the received file data in order to send out a data re-transfer request to the transmission side or execute an interpolating process on the received data so as to prevent missing of data.

The packet division unit 21 executes packet division of data received from the file receiver unit 23 to obtain the voice data RTPs in clause units and reproduce a replica of a plurality of RTPs as a single clause. The communication terminal 22 generates transmission side voice data from the plurality of RTPs received from the packet division unit 21, and causes the generated data to be outputted as voice from the loudspeaker.

In the above second embodiment, in addition to the advantage obtainable with the previous first embodiment that, transfer of the meaning of each clause and also reliable data transfer are obtainable even in the event of packet missing occurrence of the communication path due to deterioration of the communication environment stemming from such cause as communication line deterioration, it is possible to recognize missing of received data on the basis of the file data received from the file receiver unit 23 so as to send out a data re-transfer request or prevent missing of data through an interpolating process on the received data.

Figure 3:
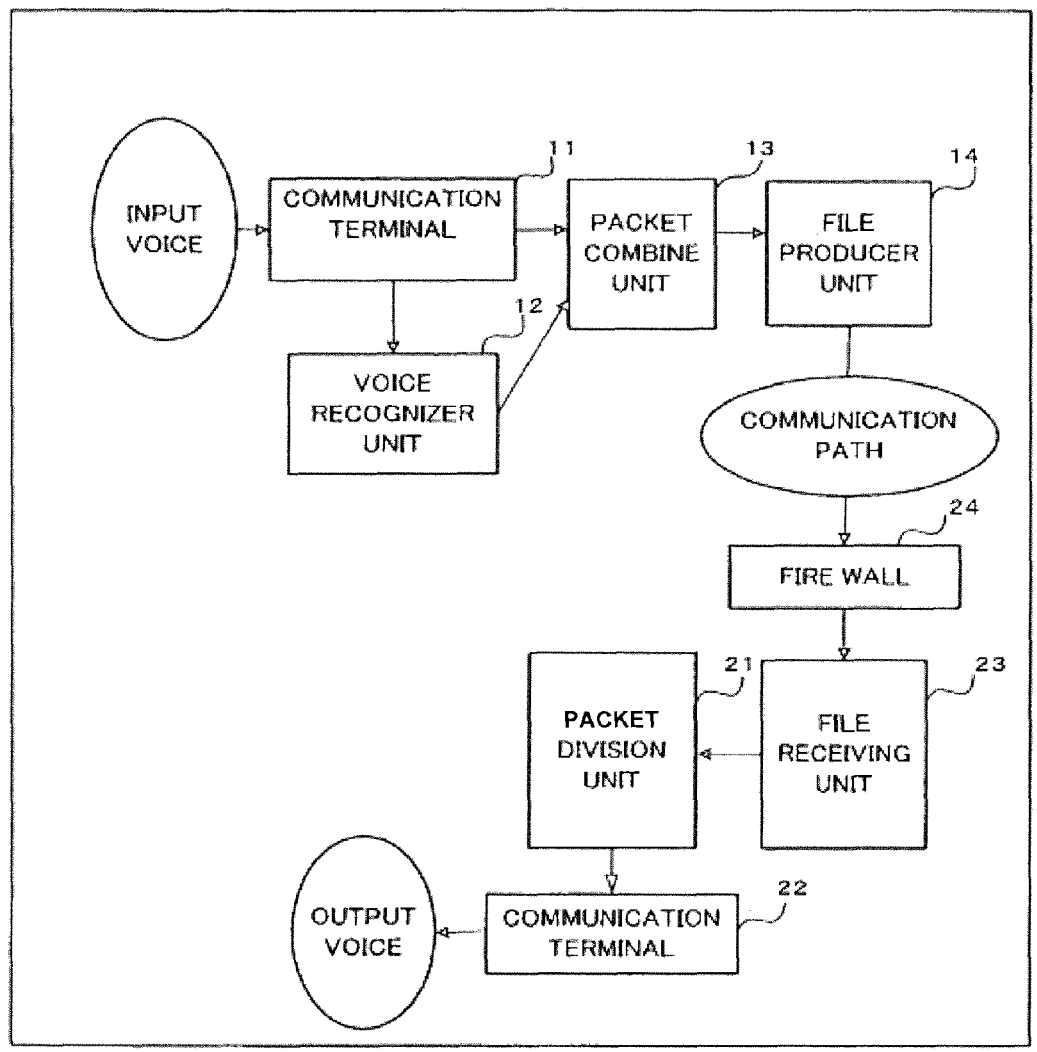
FIG. 3 is a system structure of a voice data transmitting and receiving system of a third embodiment according to the present invention.

A third embodiment of the voice data transmitting/receiving system according to the present invention will now be descried with reference to the block diagram of FIG. 3. In FIG. 3, parts having functions like those in the case of FIG. 2 are designated by like reference numerals.

This embodiment is basically the same in arrangement and operation with the above second embodiment shown in FIG. 2. This embodiment is greatly effective in a case where a firewall 24 is provided between the communication path and the reception side. In this embodiment, the file producer unit 14 sends out the file data by making use of a generally open port such as HTTP and FTP, and in order for discrimination from any other file, discrimination data is provided after the file production.

On the reception side, the file receiver unit 23 which is connected via the Internet or like communication path, takes out a file transmitted from the file producer unit 14 from the full received file on the basis of the discrimination data, and sends out the taken-out file to the packet division unit 21. The file receiver unit 23, like the above case, recognizes missing of received data and sends out a data re-transfer instruction to prevent missing of data through an interpolation process of the received data.

In the third embodiment, in addition to the advantage obtainable in the first and second embodiments that transfer the meaning of each clause and also reliable data transfer is obtainable irrespective of packet missing on the communication path due to deterioration of the communication environment stemming from such cause as communication line deterioration, and that the data missing can be prevented by a data re-transfer process and a received data interpolation process based on the recognition of received data missing based on the received file data, it is possible to obtain communication with a communication terminal over a firewall.

Further embodiments of the present invention will now be described, which are different forms of a voice clause separation (or discrimination) system.

In a fourth embodiment of the present invention, signals representing manual clause divisions are outputted. it is thus possible to input necessary divisions with a person's judgment by using a manual clause division device.

With this embodiment, division data can be inputted in any environment. Thus, the embodiment can be used not only for voice but also for music and continuous tones. Furthermore, the embodiment can be used for other RTP communications such as image communication.

In a fifth embodiment of the present invention, voice clause divisions are determined based on the measured input sound level. More specifically, the inputted sound level is measured, and an instant when the measured level is reduced down to a particular level, is determined to be a division or an off-division. The particular value in this case may be the noise level when the utterance comes to a pause.

This embodiment permits automatically dividing clauses at natural divisions in the utterance.

In a sixth embodiment of the present invention, voice clause divisions are determined based on the measured input sound pitch. Specifically, the input sound pitch is measured, and an instant when a pitch difference exceeds a constant value is determined to be a division.

This embodiment permits automatically discriminating off-divisions of utterance irrespective of whether the background noise level is high.

In a seventh embodiment of the present invention, voice clause off-divisions are determined based on the movement of lips by making image measurement of the face of a person during voice input. In other words, image measurement of a person during voice input is made, and an instant when the movement of the lips becomes stagnant is determined to be a division.

With this embodiment, divisions are determined with a mechanism different from the voice process, and it is thus possible to automatically discriminate divisions without any appropriate voice discriminator.

In an eighth embodiment of the present invention, voice clause divisions are determined based on the measured vibrations of the throat. Specifically, vibrations of the throat are measured, and an instant when the vibration is stopped is determined to be the division.

With this embodiment, divisions-off are determined with a mechanism different from the voice process, and it is thus possible to automatically discriminate off-divisions without any appropriate voice discrimination. The embodiment can also be used in the case of extremely low voice level.

In a ninth embodiment of the present invention, voice clause off-divisions are determined by a method of discrimination and analysis of voice as compositions. Specifically, voice is analyzed as compositions, and proper off-divisions are determined. As techniques of analysis of voice to compositions, well-known techniques may be used.

With this embodiment, it is possible to automatically determine off-divisions from meanings even in an environment, in which the above method cannot be utilized, for instance with flat and long continuous voice.

A tenth embodiment of the present invention will now be described.

This embodiment is installed on the transmission side (or reception side), and an optimum communication means is informed to both the transmitting and receiving communication terminals by observing the communication status.

Figure 4:
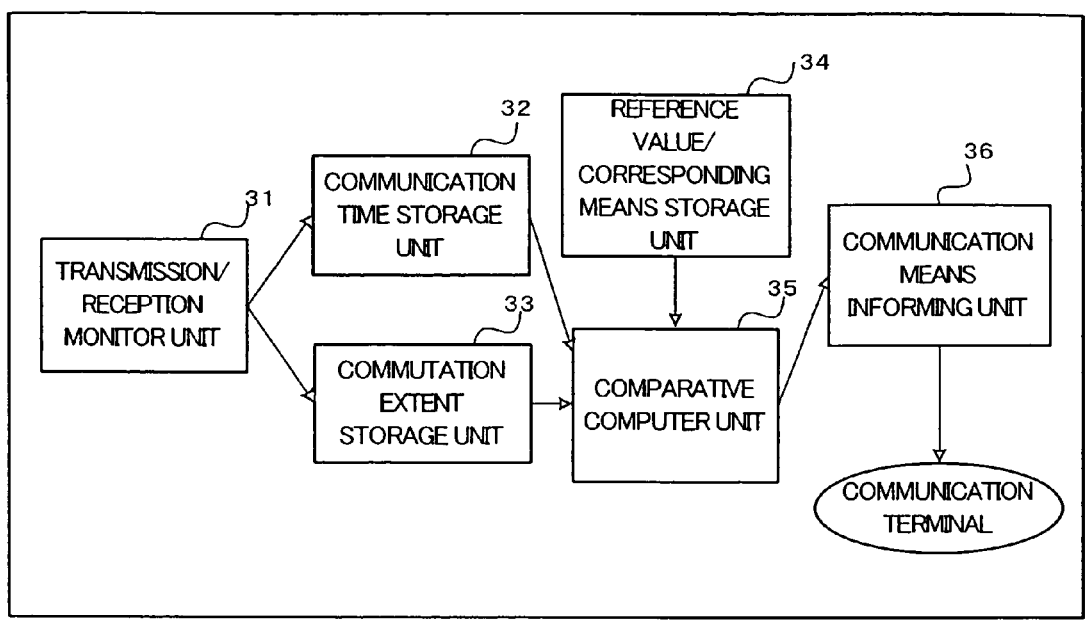
FIG. 4 is a system structure of a voice data transmitting and receiving system of a fourth embodiment according to the present invention.

FIG. 4 is a block diagram showing the present embodiment.

This embodiment comprises a transmission/reception monitor unit 31 for sensing the start and end of communication, a communication time storage unit 32 for accumulating communication time, a communication extent storage unit 33 for accumulating the quantity of transmitted or received data, a reference value/corresponding means storage unit 34 for storing reference values for switching communication means and also these communication means, a comparative computer unit 35 for calculating the communication extent from the outputs of the communication time storage unit 32 and the communication extent storage unit 33, comparing the calculated value with the reference values stored in the reference value/corresponding means storage unit 34, and a communication means informing unit 36 for receiving a communication means from the comparative computer means 35 and commanding the switching to the received communication means.

The operation of the embodiment will now be described with reference to FIG. 5.

When the communication is started, the transmission/reception monitoring unit 31 senses the start for communication, and causes the communication time storage unit 32 and the communication extent storage unit 33 to start accumulations, respectively. Whenever a constant time passes, the data stored in the communication time storage unit 32 and the communication extent storage unit 33 are sent out to the comparative computer unit 35, while the accumulated data in the communication time storage unit 32 and the communication extent storage unit 33 are deleted. The comparative computer unit 35 computes the extent of communication per unit time from the data sent out from the communication time storage unit 32 and the communication extent storage unit 33, compares the result of calculation with the reference values stored in the reference value/corresponding means storage unit 34, and sends out the data of the corresponding communication means to the communication means informing unit 36. The communication means informing unit 36 sends out a command for switching to the selected communication means to the communication terminal. When the communication is ended, the transmission/reception monitoring unit 31 senses the end of accumulations, and notifies the end of accumulations and deletion of the stored values to the communication time storage unit 32 and the communication extent storage unit 33. As shown, in this embodiment the above systems can be selectively used based on the extent of communication per unit time between the transmission and reception sides.

With this embodiment, the transmission/reception can do communication with optimum communication means matched to the environment of the communication path. As examples of the communication means, the RTP communication may be normally selected, the clause division packet communication may be selected in a bad communication path environment, and the file production communication may be selected in the worse communication path environment.

The arrangements and operations of the preferred embodiments have been described above. However, these embodiments are merely examples of the present invention and are by no means limitative. It will now be readily understood to the person skilled in the art that various changes and modifications are possible in dependence on particular uses without departing from the scope of the present invention.

As has been described in the foregoing, with the voice data transmission/reception system according to the present invention not only is it possible to obtain transfer of the meaning of each clause and reliable data transfer even when missing of packets occurs on the communication path due to deterioration of communication environments stemming from such cause as communication line deterioration, but also it is possible to send out a data re-transfer request by recognizing missing of received data and prevent data missing by a received data interpolation process, thus permitting communication with a communication terminal in the presence of a firewall.

Furthermore, the transmitting and receiving communication terminals can do communication with proper communication means by matching the environment of the communication path.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A voice data transmitting and receiving system comprising:
a transmitting terminal including: a first generation unit that generates voice data Real-time Communication Packets (RTPs) based on received data; a division unit that divides the voice data RTPs into a plurality of voice data RTPs in clause units; a second generation unit that combines the plurality of voice data RTPs in the clause units obtained by the division unit to generate a single piece of packet data; a third generation unit that converts the single piece of packet data generated by the second generation unit into file data; and wherein, according to a monitored communication status, the transmitting terminal transmits the data generated by the first generation unit through a transmission path when the communication status is normal, transmits the data generated by the second generation unit when the communication status is poor, and transmits the data generated by the third generation unit when the communication status is poor even further, and a receiving terminal that restores received data to reproduce voice data, wherein the receiving terminal restores the voice data RTPs when the voice data RTPs are transmitted through the transmitting path in the normal communication status, obtains packet data in the clause units by performing packet division on the received single piece of packet data and restores the plurality of voice data RTPs when the single piece of packet data is transmitted in the poor communication status, and restores the file data when the file data is transmitted in the further poor communication status.

2. The voice transmitting and receiving system according to claim 1, wherein the receiving terminal recognizes data missing in the received data based on the received file data, and decides whether to send out a data re-transfer instruction or execute an interpolation process on the received data.

3. The voice transmitting and receiving system according to claim 1, wherein identification information is added to the file data transmitted from the transmitting terminal.

4. The voice transmitting and receiving system according to claim 3, wherein the receiving terminal takes out the transmitting data from the received file data based on the identification information.

5. The voice transmitting and receiving system according to claim 1, wherein the division unit divides the voice data RTPs by voice recognition.

6. The voice transmitting and receiving system according to claim 1, wherein the division unit divides the voice data RTPs according to an instruction by a user.

7. The voice transmitting and receiving system according to claim 1, wherein the division unit divides the voice data RTPs based on a sound level of the received voice data.

8. The voice transmitting and receiving system according to claim 1, wherein the division unit divides the voice data RTPs based on change in a sound pitch of the received voice data.

9. The voice transmitting and receiving system according to claim 1, wherein the division unit divides the voice data RTPs based on a measured movement of a user's lips.

10. The voice transmitting and receiving system according to claim 1, wherein the division unit divides the voice data RTPs based on a measured vibration in a user's throat.

11. A method, comprising: generating, by a first generation unit, voice data Real-time Communication Packets (RTPs) based on received voice data; dividing, by a division unit, the voice data RTPs into a plurality of voice data RTPs in clause units; combining, by a second generation unit, the plurality of voice data RTPs in the clause units to generate a single piece of packet data; converting, by a third generation unit, the single piece of packet data into file data; and observing a communication status, wherein a transmitting terminal, which comprises the first generation unit, the division unit, the second division unit, and the third generation unit: transmits the voice data RTPs generated by the first generation unit in response to a first communication status, transmits the single piece of packet data generated by the second generation unit in response to a second communication status, and transmits the file data generated by the third generation unit in response to a third communication status.

12. The method according to claim 11, further comprising adding identification information to the file data.

13. The method according to claim 11, wherein the division unit divides the voice data RTPs based on voice recognition information.

14. The method according to claim 11, wherein the division unit divides the voice data RTPs according to an instruction by a user.

15. The method according to claim 11, wherein the division unit divides the voice data RTPs based on a sound level of the received voice data.

16. The method according to claim 11, wherein the division unit divides the voice data RTPs based on change in a sound pitch of the received voice data.

17. The method according to claim 11, wherein the division unit divides the voice data RTPs based on a measured movement of a user's lips.

18. The method according to claim 11, wherein the division unit divides the voice data RTPs based on a measured vibration in a user's throat.

19. The method according to claim 11, wherein a communication quality associated with the first communication status is superior to a communication quality associated with the second communication status, and the communication quality associated with the second communication status is superior to a communication quality associated with the third communication status.

* * * * *